Patented June 29, 1937

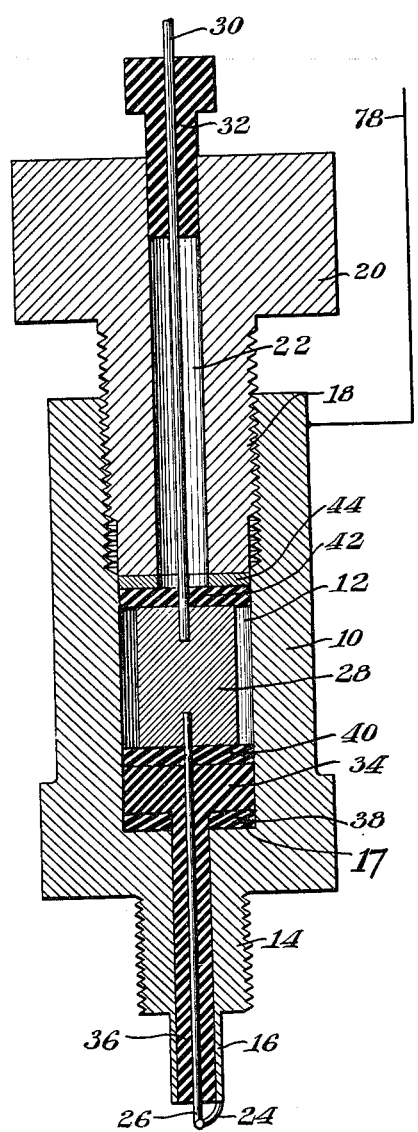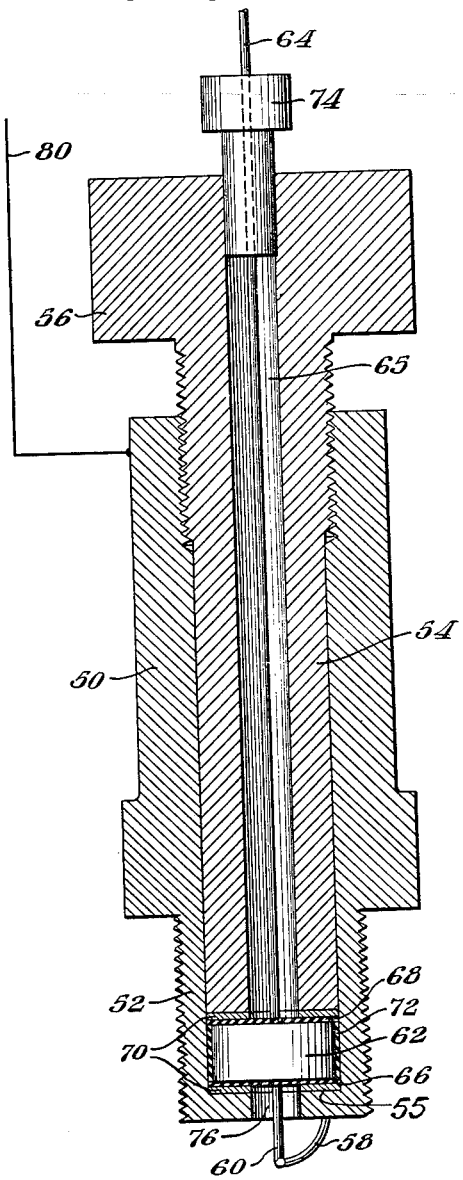

2,084,992

UNITED STATES PATENT OFFICE 2,084,992

THERMOCOUPLE PLUG

Walter Claypoole, Glenham, N. Y., assignor to The Texas Company, New York, N. Y., a corporation of Delaware Application May 2, 1935, Serial No. 19,425

6 Claims. (Cl. 136—4)

This invention relates to devices to be used in measuring temperature and more particularly to a thermocouple adapted to be mounted in the wall of and project into a vessel containing a liquid at high temperature and pressure. The primary object of the invention is to provide a device of this type which can be used in measuring the temperatures of the liquid in the vessel and which is so constructed as to positively prevent leakage of the liquid through the thermocouple to the outside of the vessel.

Several attempts have been made in the past to develop a cement which could be used both as an electrical insulator for a thermocouple and also as an efficient means for sealing such a device against high pressure leaks. These efforts have not met with appreciable success because of the unusual requirements for such a cement. A cement of this type must have a softening point definitely above the maximum operating temperature of the vessel and it must adhere to the surface to which it is applied over the entire temperature range to which it is exposed in service. Furthermore, the cement must not crack while it is in use and the electrical resistivity must be high even at the maximum operating temperature.

In accordance with this invention a thermocouple assembly has been provided in which there is no necessity for cement of any kind. The two thermocouple wires which may be of suitable materials such as iron and constantan, are mounted within or upon a housing preferably threaded so that it may be screwed into and through the wall of an autoclave or other vessel containing liquid the temperature of which is to be measured. The constantan wire passes outwardly through the housing and the liquid pressure seal is made by screwing a plug into the housing against one or more mica washers. The compressed mica washers serve as electrical insulation and also prevent the leakage of any of the liquid through the thermocouple housing.

For a better understanding of the invention reference may be had to the accompanying drawing in which Figure 1 is a longitudinal section through a preferred form of the thermocouple while Figure 2 is a longitudinal view partly in section through another form of the invention.

Referring to Figure 1, a housing member 10 preferably of iron and containing a longitudinal opening 12 is provided at one end with a threaded extension 14 which may be screwed into a correspondingly threaded opening in the wall of an autoclave or other vessel containing a liquid the temperature of which is to be measured. The extension 14 is provided with a longitudinal opening 16 through which is passed one of the thermocouple wires to be described hereinafter. The opening 16 is of smaller diameter than the opening 12 and a shoulder 17 is thus formed intermediate the ends of the housing. The other end of the housing 10 is internally threaded as at 18 to accommodate a threaded plug 20 which is provided with a longitudinal opening 22 substantially in alignment with the opening 16 of the housing extension 14.

One end of a short piece of iron wire 24 is welded to the end of the extension 14 and a wire 26 of a copper-nickel alloy such as constantan, the end of which is fused as by spot welding to the projecting end of the iron wire 24, passes into the housing 10 through the opening 16. The other end of the constantan wire 26 is tapped into one face of a cylindrical steel block 28 while another constantan wire 30 is tapped into the opposite face of the steel block 28 and passes outwardly through opening 22 in the plug 20. A plug 32 of a suitable electrically insulating material such as porcelain or a phenolic condensation product may be placed in the opening 22 where it will serve to center and support the constantan wire 30.

An electrically insulating member having good heat resisting qualities, which may be formed of a metal silicate such as "Isolantite" and having a cylindrical head 34 and a shank 36, fits within the openings 12 and 16 of the housing 10. The constantan wire 26 passes longitudinally through the insulating member and the wire is thus firmly supported and electrically insulated from the iron housing 10.

In accordance with the invention a pressure seal is provided, this seal being shown as comprising three mica discs or washers 38, 40 and 42 arranged respectively between the housing 10 and the insulating head 34, the head 34 and the steel block 28, and the block 28 and the inner end of the plug 20.

After the device has been assembled, as shown in Figure 1, the plug 20 is screwed tightly into the housing 10 thus compressing the mica washers 38, 40 and 42 so that they will prevent the passage through the device of any liquid which might find its way into the housing extension 14. A smooth steel washer 44 is preferably mounted between plug 20 and the washer 42 to prevent tearing or flaking of the mica when the plug 20 is screwed into the housing 10.

While it is preferred to use the mica washers as a pressure seal these washers may, if desired, be replaced by layers of a material such as a dental cement formed of zinc oxide and zinc chloride or zinc oxy-chloride. The plug 20 could then be tightened in the housing 10 before the cement layers were hardened and after the hardening of the cement an efficient seal would thus be formed.

Another form of the invention has been illustrated in Figure 2, the principle embodied in this form being the same as that which has been described with reference to the form shown in Figure 1. An iron housing member 50 having a threaded extension 52 and a longitudinal opening 54 provided with a shoulder 55 is internally threaded at one end to receive a pressure plug 56 similar to the plug 20 of Figure 1. An iron wire 58 is welded to the end of the extension 52 and is fused or welded at its other end to a piece of constantan wire 60. The constantan wire 60 is tapped into a cylindrical steel block 62 slightly smaller in diameter than the opening 54, and another length of constantan wire 64 is tapped into the opposite face of the steel block 62 and passes outwardly through a longitudinal opening 65 in the plug 56.

A mica washer 66 is mounted between the steel block 62 and the housing 50 while another similar mica washer 68 is located between the block 62 and the inner end of the plug 56. A pair of smooth steel washers 70 are preferably mounted adjacent the mica washers 66 and 68. A comparatively thin envelope 72 of mica or "Isolantite" surrounds the steel block 62 and serves to electrically insulate this block from the housing 50. An electrically insulating plug 74 is preferably used to support the constantan wire 64 in the opening 65.

With this form of the invention, as was also the case with reference to the form shown in Figure 1, as the plug 56 is screwed into the housing 50 the mica washers 66 and 68 will be compressed, thus forming a seal to prevent passage of the liquid through the thermocouple housing. If desired, the small opening 76 at the end of the housing extension 52 may be filled with mica, porcelain or some other suitable electrically insulating and heat resistant material not shown, in order to keep out oil and reduce carbonization in case the device is used to measure oil temperatures.

As will be apparent to those familiar with the use of thermocouples, the constantan wires 30 and 64 and other wires 78 and 80 electrically connected respectively to the iron housings 10 and 50, will be connected to suitable meters or to control devices responsive to the changes in E. M. F. caused by temperature variations at the junctions between the iron and constantan wires.

Obviously many other modifications and variations of the invention, as hereinbefore set forth, may be made without departing from the spirit and scope thereof, and therefore only such limitations should be imposed as are indicated in the appended claims.

I claim—

1. A thermocouple plug comprising a metal housing having a longitudinal opening formed to provide a shoulder intermediate the ends thereof, a plug member having a threaded connection with said opening at one end of said housing and confronting said shoulder, a thermocouple wire attached to and projecting from the other end of said housing, a second thermocouple wire fused to the projecting end of said first mentioned wire and extending into the opening in said housing, a metal block in said opening between said shoulder and said plug member, said second wire being attached to one side of said block, a third wire attached at one end to the opposite side of said block and extending outwardly of said housing through said plug member, insulating means separating said block from said shoulder and said plug member, said means adapted to be compressed when said plug is screwed into said opening to form a liquid-tight seal in said housing.

2. A thermocouple plug comprising a metal housing having a longitudinal opening formed to provide an annular shoulder intermediate the ends thereof and an extension at one end adapted to be mounted in contact with a liquid the temperature of which is to be measured, a plug member adapted to be screwed into said opening at one end of said housing and confronting said shoulder, a thermocouple wire attached to and projecting from said extension, a second thermocouple wire fused to the projecting end of said first mentioned wire and extending into the opening in said housing, a parallel-faced metal block in said opening between said shoulder, said second wire being attached to one face of said block, a third wire of the same material as said second wire and attached at one end to the other face of said block and extending outwardly of said housing through said plug member, a pair of electrically insulating discs closely fitting the opening in said housing and separating said block from said shoulder and said plug member, the arrangement being such that the discs will be compressed when said plug is screwed into said opening so as to form a liquid-tight seal in said housing.

3. A thermocouple plug comprising a metal housing adapted to be inserted in the wall of a vessel containing a liquid the temperature of which is to be measured, said housing having a longitudinal opening formed to provide an annular shoulder intermediate the ends thereof, a plug member threaded into said opening at one end of said housing and facing said shoulder, an iron wire attached to and projecting from the other end of said housing, a constantan wire fused at one end to the projecting end of said iron wire and extending into the opening in said housing, a cylindrical metal block in said housing between said shoulder and said plug member, said constantan wire being connected to one end face of said block, a second constantan wire connected to the other end face of said block and extending outwardly through said plug, and a pair of mica washers closely fitting the opening in said housing and separating said steel block from said shoulder and said plug member, the arrangement being such that when said plug is screwed tightly into said housing said mica washers will be compressed to effect a liquid-tight seal.

4. A thermocouple plug comprising a metal housing having a longitudinal opening formed to provide a shoulder intermediate the ends thereof, a plug member adapted to be screwed into said opening at one end of said housing so that the inner end of said plug member will face said shoulder, a thermocouple wire attached to and projecting from the other end of said housing, a second thermocouple wire fused to the projecting end of said first mentioned wire and extending into the opening in said housing, a cylindrical metal block within the opening in said housing and between said shoulder and said plug member, said second wire being attached to one end face of said block, a third wire attached at one end to the opposite end face of said block and extending outwardly of said housing through said plug member, a pair of mica discs closely fitting the opening in said housing and separating said block from said shoulder and said plug, a smooth-faced steel washer between said plug and the adjacent mica disc, the arrangement being such that the mica discs will be compressed when said plug is screwed into the housing so as to form a liquid-tight seal.

5. A thermocouple plug comprising a housing having a longitudinal opening formed to provide a shoulder intermediate the ends thereof, a plug member having a threaded connection with said opening at one end of said housing and facing said shoulder, a thermocouple wire attached to and projecting from the other end of said housing, a second thermocouple wire fused to the projecting end of said first mentioned wire and extending into the opening in said housing, a metal block in said opening between said shoulder and said plug member, said second wire being attached to one side of said block, a third wire attached at one end to the opposite side of said block and extending outwardly of said housing through said plug member, insulating means comprising layers of dental cement separating said block from said shoulder and said plug, said means forming a liquid-tight seal when said plug is screwed tightly into said housing.

6. A thermocouple plug comprising a metal housing having a longitudinal opening formed to provide an annular shoulder intermediate the ends thereof, a plug member adapted to be screwed into said opening at one end of said housing so as to face said shoulder, a thermocouple wire attached to and projecting from said extension, a second thermocouple wire connected to the projecting end of said first mentioned wire and extending into said housing, an insulating member surrounding the major portion of said second wire and provided with a flat head closely fitting the opening in the housing, a parallel-faced metal block in said opening between said flat head and said plug member, said second wire being attached to one face of said block, a third wire attached at one end to the other face of said block and extending outwardly of said housing through said plug member, and electrically insulating washers closely fitting the opening in said housing, said washers being placed between said shoulder and the head of said insulating member, between said insulating head and the first mentioned face of said block, and between the second mentioned face of said block and said plug, so that as said plug is screwed into said housing the washers will be compressed to form a liquid-tight seal.

WALTER CLAYPOOLE.

CERTIFICATE OF CORRECTION.

Patent No. 2,084,992.

June 29, 1937.

WALTER CLAYPOOLE.

It is hereby certified that error appears in the printed specification of the above numbered patent requiring correction as follows: Page 2, second column, line 26, claim 2, after "shoulder" insert the words and said plug member; and that the said Letters Patent should be read with this correction therein that the same may conform to the record of the case in the Patent Office.

Signed and sealed this 5th day of October, A. D. 1937.

Henry Van Arsdale (Seal)

Acting Commissioner of Patents.